US010182297B2

(12) United States Patent
Pompei (10) Patent No.: US 10,182,297 B2
(45) Date of Patent: *Jan. 15, 2019

(54) ULTRASONIC TRANSDUCER (71) Applicant: Frank Joseph Pompei, Wayland, MA (US)

(72) Inventor: Frank Joseph Pompei, Wayland, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/623,780

(22) Filed: Jun. 15, 2017

(65) Prior Publication Data
US 2017/0289701 A1 Oct. 5, 2017

Related U.S. Application Data (62) Division of application No. 14/442,078, filed as application No. PCT/US2013/045365 on Jun. 12, 2013, now Pat. No. 9,686,618.

(60) Provisional application No. 61/658,452, filed on Jun. 12, 2012.

(51) Int. Cl.
H04R 19/02 (2006.01)
H04B 11/00 (2006.01)
B06B 1/02 (2006.01)
H04R 19/04 (2006.01)

(52) U.S. Cl.
CPC .......... *H04R 19/02* (2013.01); *B06B 1/0292* (2013.01); *H04B 11/00* (2013.01); *H04R 19/04* (2013.01); *H04R 2217/03* (2013.01); *H04R 2400/01* (2013.01)

(58) Field of Classification Search
CPC ........ H04R 11/00; H04R 19/02; H04R 19/04; H04R 2217/03; B06B 1/0292
See application file for complete search history.

(56) References Cited

U.S. PATENT DOCUMENTS

| 3,373,251 | A |   | 3/1968 | Seeler |
| 3,908,098 | A | * | 9/1975 | Kawakami ............. H04R 19/00 367/189 |
| 4,311,881 | A |   | 1/1982 | Reynard |
| 4,403,117 | A |   | 9/1983 | Paglia |
| 6,775,388 | B1 |   | 8/2004 | Pompei |
| 7,715,080 | B2 |   | 5/2010 | Natarajan et al. |
| 7,732,987 | B2 | * | 6/2010 | Gao ...................... B06B 1/0622 310/328 |
| 8,009,838 | B2 |   | 8/2011 | Lee et al. |

(Continued)

FOREIGN PATENT DOCUMENTS

EP 0973149 1/2000

*Primary Examiner* — Tuan D Nguyen
(74) *Attorney, Agent, or Firm* — BainwoodHuang (57) ABSTRACT Ultrasonic transducers that are capable of generating increased levels of ultrasound, as well as receiving ultrasonic waves with increased sensitivity. The ultrasonic transducers include a back cover, a protective front cover, a backplate, and a vibrator film layer disposed between the backplate and the protective front cover. The backplate includes a plurality of grooves formed on a surface thereof facing the vibrator film layer. Each groove includes upper edges having cross-sectional contours that gradually tend toward the deepest part of the groove to allow a larger area of the backplate to be closer to the vibrator film layer, thereby increasing the resulting electric field, and, consequently, increasing the output power and sensitivity of the ultrasonic transducer.

6 Claims, 8 Drawing Sheets (56) References Cited

U.S. PATENT DOCUMENTS

| | | |
|---|---|---|
| 8,953,821 B2 | 2/2015 | Pompei |
| 2005/0215907 A1 | 9/2005 | Toda et al. |

* cited by examiner

ULTRASONIC TRANSDUCER

CROSS-REFERENCE TO RELATED APPLICATIONS

This application is a divisional of U.S. patent application Ser. No. 14/442,078 filed May 11, 2015 entitled ULTRASONIC TRANSDUCER, which claims benefit of the priority of International Patent Application No. PCT/US2013/045365 filed Jun. 12, 2013 entitled ULTRASONIC TRANSDUCER, which claims benefit of the priority of U.S. Provisional Patent Application No. 61/658,452 filed Jun. 12, 2012 entitled ULTRASONIC TRANSDUCER.

TECHNICAL FIELD

The present application relates generally to acoustic transducers, and more specifically to high performance ultrasonic transducers capable of generating increased levels of ultrasound, as well as receiving ultrasonic waves with increased sensitivity.

BACKGROUND

Ultrasonic transducers are known that have a laminated construction, enabling the formation of multiple, generally circular ultrasonic transducers (e.g., up to about 80 or more) in an ultrasonic transducer array. Such ultrasonic transducers can include first and second insulative retaining layers, and a vibrator film layer sandwiched between the respective first and second retaining layers. The first retaining layer can include a first plurality of circular apertures formed therethrough and the second retaining layer can include a second plurality of circular apertures formed therethrough, in which the second plurality of apertures is substantially in registration with the first plurality of apertures. Such ultrasonic transducers can further include first and second cover portions, and the combination of the first retaining layer, the vibrator film layer, and the second retaining layer can be sandwiched between the first and second cover portions.

In the ultrasonic transducers described above, the side of the vibrator film layer facing the first retaining layer is typically unmetallized, and the opposite side of the vibrator film layer facing the second retaining layer is typically metallized. The ultrasonic transducer can further include a plurality of circular, electrically conductive backplates and a plurality of electrically conductive coil springs, which can be disposed between the first cover and the vibrator film layer in substantially the same plane as the first retaining layer. Each circular backplate is substantially in registration with respective circular apertures formed through the first and second retaining layers. Further, each circular backplate typically includes a plurality of grooves, such as V-shaped grooves or trapezoid-shaped grooves, formed on surface thereof. The plurality of grooves are typically machined, etched, or stamped on the backplate surface, and are typically fabricated to have sharp corners and/or edges and straight sides. Each coil spring is disposed between a respective backplate and the first cover. The coil springs are both mechanically and electrically connected to respective backplates and the first cover, which has an electrically conductive surface. The first cover portion, the coil springs, the respective circular backplates, and the combination of the first retaining layer, the vibrator film layer, and the second retaining layer, are configured to cause the coil springs to urge the circular backplates against the unmetallized side of the vibrator film layer through the respective circular apertures.

With further regard to the ultrasonic transducers described above, the combination of the electrically conductive first cover, the coil springs, and the circular backplates forms a first electrode, and the metallized side of the vibrator film layer forms a second electrode. The ultrasonic transducers are configured to allow a voltage to be applied between the first and second electrodes, thereby generating an electric field between the vibrator film layer and the backplates that causes the film to be attracted to the respective backplates. In the event the voltage applied between the first and second electrodes is AC, the film can vibrate, in a transmitting mode, to generate compression waves at sonic or ultrasonic frequencies. In a receiving mode, incoming acoustic waves impacting the ultrasonic transducer are converted to a voltage waveform.

SUMMARY

In accordance with the present application, ultrasonic transducers are disclosed that are capable of generating increased levels of ultrasound, as well as receiving ultrasonic waves with increased sensitivity.

In one aspect, the disclosed ultrasonic transducers each include a back cover, a protective front cover, a backplate, one or more springs (e.g., leaf springs), and a vibrator film layer disposed between the backplate and the protective front cover. For example, a plurality of such ultrasonic transducers (e.g., up to about 8 or more) can be implemented in an ultrasonic transducer array. The backplate can be rectangular, square, hexagonal, or any other suitable geometric shape, and can be made of metal, an insulative material coated with metal, or any other suitable material. The side of the vibrator film layer facing the protective front cover is metallized, and the opposite side of the vibrator film layer facing the backplate is unmetallized. The springs are configured to urge the backplate against the unmetallized side of the vibrator film layer. The backplate forms, at least in part, a first electrode, and the metallized side of the vibrator film layer forms a second electrode. The ultrasonic transducer is configured to allow a voltage to be applied between the first and second electrodes, thereby generating an electric field between the vibrator film layer and the backplate that causes the film to be attracted to the backplate. In the event the voltage applied between the first and second electrodes is AC, the film can vibrate, in a transmitting mode, to generate compression waves at sonic or ultrasonic frequencies corresponding to a specific signal waveform. In a receiving mode, incoming acoustic waves impacting the ultrasonic transducer are converted to a voltage waveform.

In an exemplary aspect, the backplate includes a plurality of grooves formed on a surface thereof facing the vibrator film layer. For example, the plurality of grooves can be elongated linear grooves, circular grooves, dimple-shaped grooves, or any other suitably shaped grooves. Each groove includes upper edges having cross-sectional contours that gradually slope, incline, angle, or tend toward the deepest part of the groove to allow a larger area of the backplate surface, and thus the first electrode formed, at least in part, by the backplate, to be near the vibrator film layer, thereby increasing the resulting electric field, and, consequently, increasing the output power and sensitivity of the ultrasonic transducer. Because air can become trapped between the grooves of the backplate and the vibrator film layer, potentially causing a reduction in the output power, the backplate can include an air bleed channel configured to allow such air to be released. The air bleed channel can be implemented across the backplate surface, intersecting the plurality of grooves, to release any air trapped in the grooves at one or more edges of the backplate or through one or both sides of the backplate.

In a further exemplary aspect, the plurality of grooves on the backplate surface can each include at least one electrically conductive pillar structure (e.g., a T-shaped pillar structure) extending from the deepest part of the groove up toward the vibrator film layer to allow an even larger area of the first electrode formed, at least in part, by the backplate to be closer to the vibrator film layer, thereby further increasing the output power and sensitivity of the ultrasonic transducer.

Other features, functions, and aspects of the invention will be evident from the Detailed Description that follows.

BRIEF DESCRIPTION OF THE DRAWINGS

The accompanying drawings, which are incorporated in and constitute a part of this specification, illustrate one or more embodiments described herein and, together with the Detailed Description, explain these embodiments. In the drawings.

DETAILED DESCRIPTION

The disclosures of U.S. patent application Ser. No. 14/442,078 filed May 11, 2015 entitled ULTRASONIC TRANSDUCER, International Patent Application No. PCT/US2013/045365 filed Jun. 12, 2013 entitled ULTRASONIC TRANSDUCER, and U.S. Provisional Patent Application No. 61/658,452 filed Jun. 12, 2012 entitled ULTRASONIC TRANSDUCER are hereby incorporated herein by reference in their entirety.

Ultrasonic transducers are disclosed that are capable of generating increased levels of ultrasound, as well as receiving ultrasonic waves with increased sensitivity. The disclosed ultrasonic transducers include a back cover, a protective front cover, a backplate, one or more springs, and a vibrator film layer disposed between the backplate and the protective front cover. The backplate includes a plurality of grooves formed on a surface thereof facing the vibrator film layer. Each groove includes upper edges having cross-sectional contours that gradually slope, incline, angle, or tend toward the deepest part of the groove to allow a larger area of the backplate to be closer to the vibrator film layer, thereby increasing a resulting electric field, and, consequently, increasing the output power and sensitivity of the ultrasonic transducer.

Figure 1:
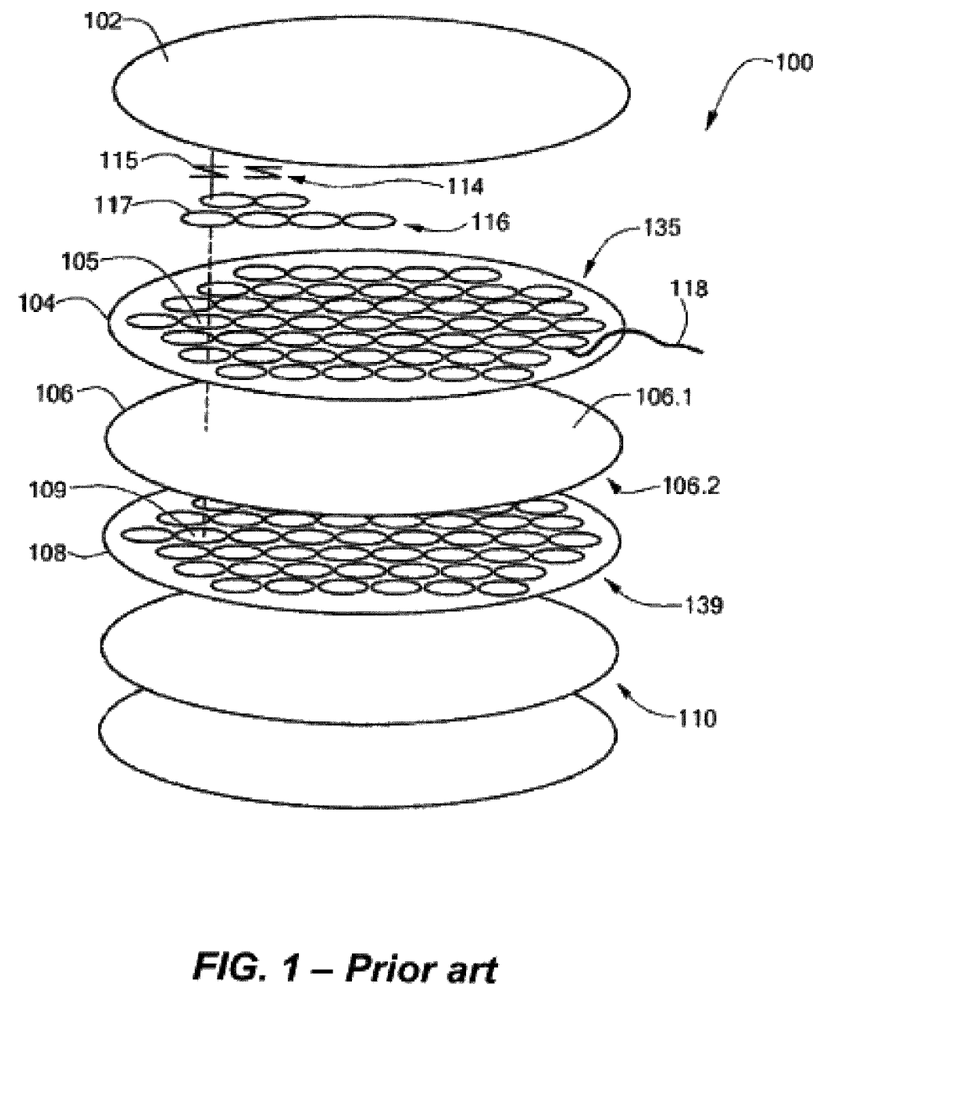
FIG. 1 is a diagram of a conventional ultrasonic transducer.

FIG. 1 depicts a conventional ultrasonic transducer 100 having a laminated construction, enabling the formation of multiple, generally circular ultrasonic transducers (e.g., up to about 80 or more) in an ultrasonic transducer array. The ultrasonic transducer 100 includes first and second insulative retaining layers 104, 108, and a vibrator film layer 106 sandwiched between the respective retaining layers 104, 108. The first retaining layer 104 can include a first plurality of circular apertures 135 formed therethrough and the second retaining layer 108 can include a second plurality of circular apertures 139 formed therethrough, in which the second plurality of apertures 139 is substantially in registration with the first plurality of apertures 135. The ultrasonic transducer 100 further includes first and second cover portions 102, 110, and the combination of the first retaining layer 104, the vibrator film layer 106, and the second retaining layer 108 is sandwiched between the first and second cover portions 102, 110.

In the conventional ultrasonic transducer 100, the side 106.1 of the vibrator film layer 106 facing the first retaining layer 104 is unmetallized, and the opposite side 106.2 of the vibrator film layer 106 facing the second retaining layer 108 is metallized. The ultrasonic transducer 100 further includes a plurality of circular, electrically conductive backplates 116 and a plurality of electrically conductive coil springs 114, which are disposed between the first cover 102 and the vibrator film layer 106 in substantially the same plane as the first retaining layer 104. Each circular backplate 117 is substantially in registration with circular apertures 105, 109 formed through the first and second retaining layers 104, 108, respectively. Further, each circular backplate 117 typically includes a plurality of grooves, such as V-shaped grooves or trapezoid-shaped grooves, formed on surface thereof. The plurality of grooves are typically machined, etched, or stamped on the backplate surface, and are typically fabricated to have sharp corners and/or edges and straight sides. Each coil spring 115 is disposed between a respective backplate 117 and the first cover 102. The coil spring 115 is both mechanically and electrically connected to the respective backplate 117 and the first cover 102, which has an electrically conductive surface. The first cover 102, the coil spring 115, the respective circular backplate 117, and the combination of the first retaining layer 104, the vibrator film layer 106, and the second retaining layer 108, are configured to cause the coil spring 115 to urge the circular backplate 117 against the unmetallized side 106.1 of the vibrator film layer 106 through the respective circular aperture 105.

With further regard to the conventional ultrasonic transducer 100, the combination of the electrically conductive first cover 102, the plurality of coil springs 114, and the plurality of circular backplates 116 forms a first electrode, and the metallized side 106.2 of the vibrator film layer 106 forms a second electrode. The ultrasonic transducer 100 is configured to allow a voltage to be applied between the first and second electrodes, thereby generating an electric field between the vibrator film layer 106 and the backplates 116 that causes the film 106 to be attracted to the backplates 116. In the event the voltage applied between the first and second electrodes is AC, the film 106 can vibrate, in a transmitting mode, to generate compression waves at sonic or ultrasonic frequencies. In a receiving mode, incoming acoustic waves impacting the ultrasonic transducer 100 are converted to a voltage waveform. It is noted that a transducer drive signal can be applied to the ultrasonic transducer 100 via a connection cable 118.

Figure 2:
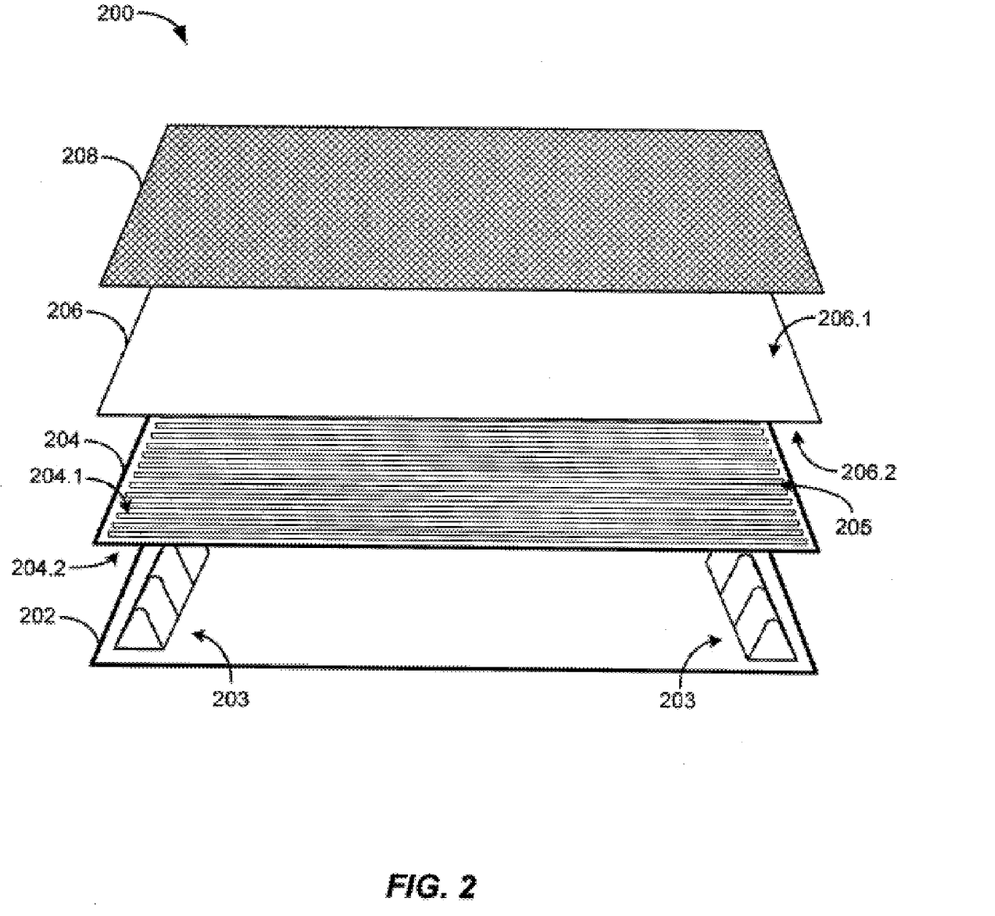
FIG. 2 is a diagram of an exemplary ultrasonic transducer, in accordance with the present application.

FIG. 2 depicts an illustrative embodiment of an exemplary ultrasonic transducer 200, having a laminated construction, which is capable of generating increased levels of ultrasound, as well as receiving ultrasonic waves with increased sensitivity, in accordance with the present application. As shown in FIG. 2, the ultrasonic transducer 200 includes a back cover 202, a protective front cover 208, a backplate 204, one or more springs 203 (e.g., leaf springs), and a vibrator film layer 206 disposed between the backplate 204 and the protective front cover 208. For example, the backplate 204 may be rectangular, square, hexagonal, or any other suitable geometric shape, may be made of metal, an insulative material coated with metal, or any other suitable material, and may be between about 1.2 in.sup.2 to 25 in.sup.2, or any other suitable size. Further, a plurality of such ultrasonic transducers (e.g., up to about 8 or more) can be implemented in an ultrasonic transducer array. The side 206.1 of the vibrator film layer 206 facing the protective front cover 208 is metallized, and the opposite side 206.2 of the vibrator film layer 206 facing the backplate 204 is unmetallized. The springs 203 are configured to urge the backplate 204 against the unmetallized side 206.2 of the vibrator film layer 206. The backplate 204 forms, at least in part, a first electrode, and the metallized side 206.1 of the vibrator film layer 206 forms a second electrode. The ultrasonic transducer 200 is configured to allow a voltage to be applied between the first and second electrodes, thereby generating an electric field between the vibrator film layer 206 and the backplate 204 that causes the film 206 to be attracted to the backplate 204. In one embodiment, the vibrator film layer 206 can be grounded for increased safety and electromagnetic shielding. In the event the voltage applied between the first and second electrodes is AC, the film 206 can vibrate, in a transmitting mode, to generate compression waves at sonic or ultrasonic frequencies corresponding to a specific signal waveform. In a receiving mode, incoming acoustic waves impacting the ultrasonic transducer 200 are converted to a voltage waveform.

As further shown in FIG. 2, the backplate 204 includes a plurality of grooves 205 formed on a surface thereof facing the vibrator film layer 206. For example, the plurality of grooves 205 can be elongated linear grooves formed in substantially parallel rows on the backplate surface (as shown in FIG. 2), circular grooves, dimple-shaped grooves, or any other suitably shaped grooves. Each linear groove 205 includes opposing upper edges having cross-sectional contours that gradually slope, incline, angle, or tend toward the deepest part of the groove 205 to allow a larger area of the first electrode formed, at least in part, by the backplate 204 to be closer to the vibrator film layer 206, thereby increasing the resulting electric field, and, consequently, increasing the output power and sensitivity of the ultrasonic transducer 200. In one embodiment, the groove 205 can have one or more walls with one or more radiused, sloped, inclined, or angled portions. For example, one or more walls of the groove 205 may be configured to have varying slopes, e.g., a shallower slope, incline, or angle at, near, or toward the upper edges of the groove 205, and to have a steeper slope, incline, or angle at, near, or toward the deepest part of the groove 205. Further, the shallower sloped, inclined, or angled portion of at least one of the groove walls may be close to parallel to the vibrator film layer 206 at, near, or toward the upper edges of the respective groove(s).

Because air can become trapped between the linear grooves 205 of the backplate 204 and the vibrator film layer 206, potentially causing a reduction in the output power, the backplate 204 includes an air bleed channel 310 (see FIGS. 3b and 3c) configured to allow such air to be released. The air bleed channel 310 can be implemented across the surface of the backplate 204, substantially perpendicular to and intersecting the rows of elongated linear grooves 205, to release any air trapped in the grooves 205 at opposing edges 312.1, 312.2 (see FIGS. 3b and 3c) of the backplate 204, or through one or both sides 204.1, 204.2 of the backplate 204. In one embodiment, at least some of the linear grooves 205 can be open-ended at one or more edges of the backplate 204 to release such trapped air.

Figure 3A:
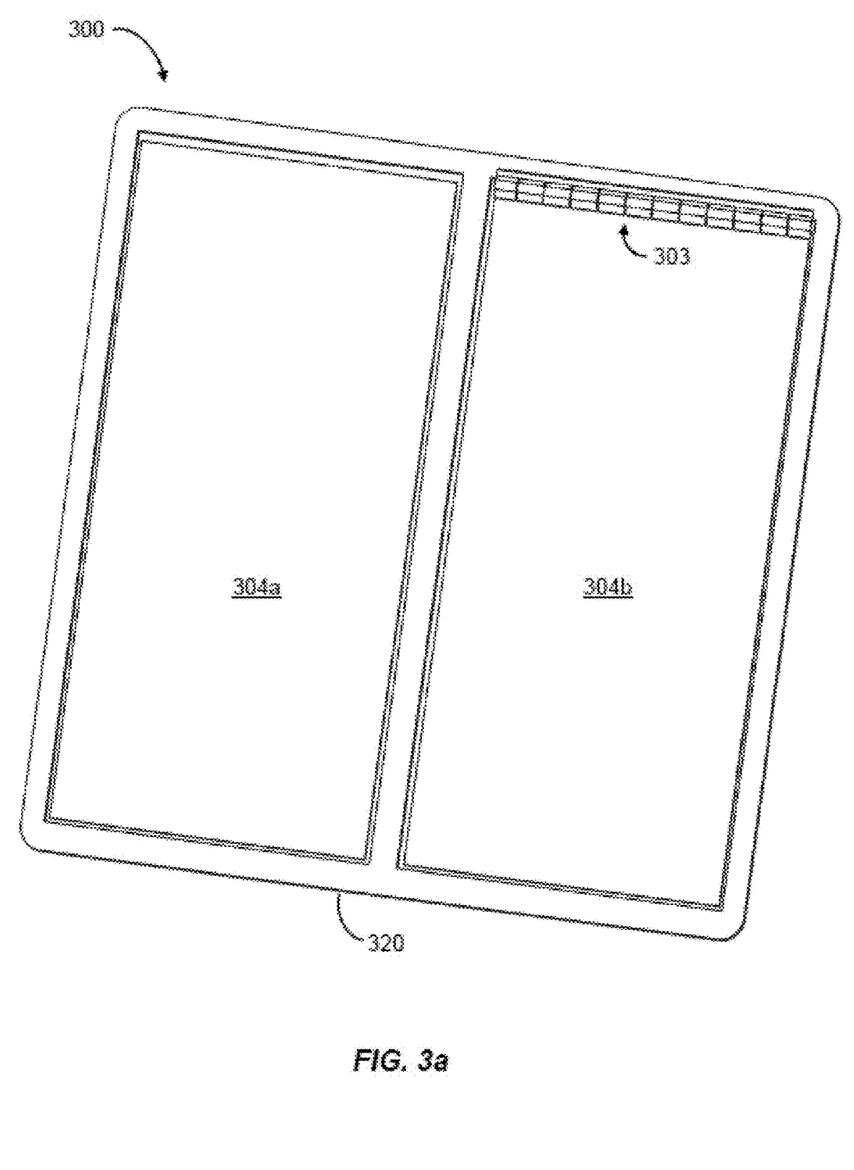
FIGS. 3a-3d are depictions of exemplary implementations of the ultrasonic transducer of FIG. 2.

FIGS. 3a-3d depict exemplary implementations of the ultrasonic transducer 200 of FIG. 2. Such exemplary implementations can include an ultrasonic transducer array 300 shown in partial construction in FIG. 3a. The ultrasonic transducer array 300 can include two ultrasonic transducers having rectangular backplates 304a, 304b, respectively, disposed in a frame 320. FIG. 3a depicts the sides 204.2 (see FIG. 2) of the respective backplates 304a, 304b that would normally face the back cover 202 (see FIG. 2). FIG. 3a further depicts a spring 303 (e.g., a leaf spring) that can be disposed in any suitable configuration between the respective backplates 304a, 304b and the back cover 202. In one embodiment, two such springs 303 are coupled to the frame 320 and disposed between the backplate 304a and the back cover 202, and, likewise, two such springs 303 are coupled to the frame 320 and disposed between the backplate 304b and the back cover 202. In another embodiment, a generally flat Z-shaped spring can be configured to engage each backplate 304a, 304b against the vibrator film layer 206 (see FIG. 2) gently, but evenly, across the vibrator film layer surface.

In one embodiment, the respective backplates 304a, 304b, including the linear grooves 305, can be fabricated using low cost techniques such as extrusion, roll forming, stamping, or machining. In a further embodiment, the backplates 304a, 304b may be made of plastic (or any other suitable material) and coated with aluminum (or any other suitable metallization), thereby lending itself to low cost injection molding fabrication techniques.

Figure 3B:
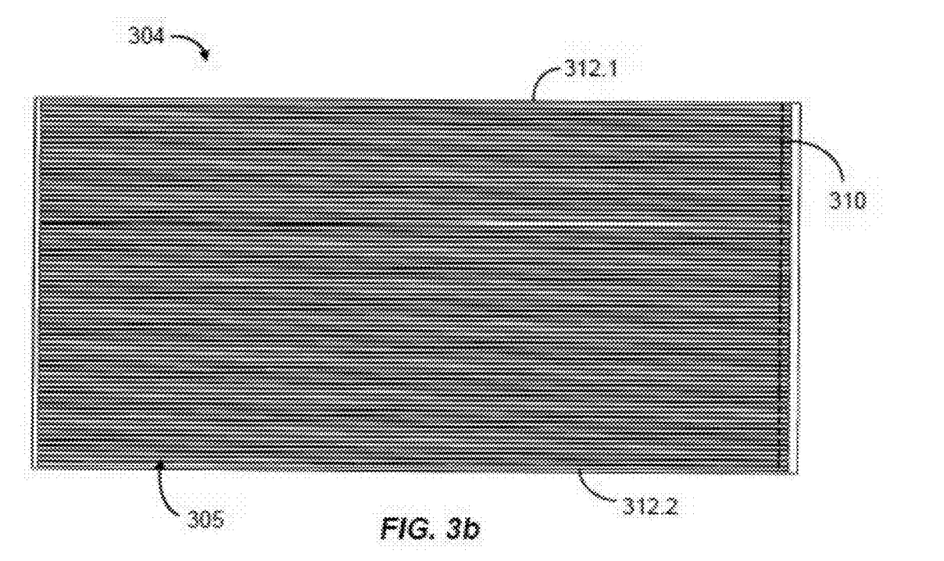

FIG. 3b depicts the side 204.1 (see FIG. 2) of one of the rectangular backplates 304a, 304b that would normally face the vibrator film layer 206 (see FIG. 2). As shown in FIG. 3b, the rectangular backplate 304 includes a plurality of elongated linear grooves 305 formed in rows on a surface thereof. In one embodiment, the rows of linear grooves 305 on the backplate surface run along the longer area dimension of the rectangular backplate 304, as shown in FIG. 3b. In another embodiment, the rows of linear grooves 305 on the backplate surface run along the shorter area dimension of the rectangular backplate 304. In a further embodiment, the rows of linear grooves 305 on the backplate surface run along the longer or shorter area dimension of the rectangular backplate 304, extending substantially to the edges of the backplate 304.

Figure 3C:
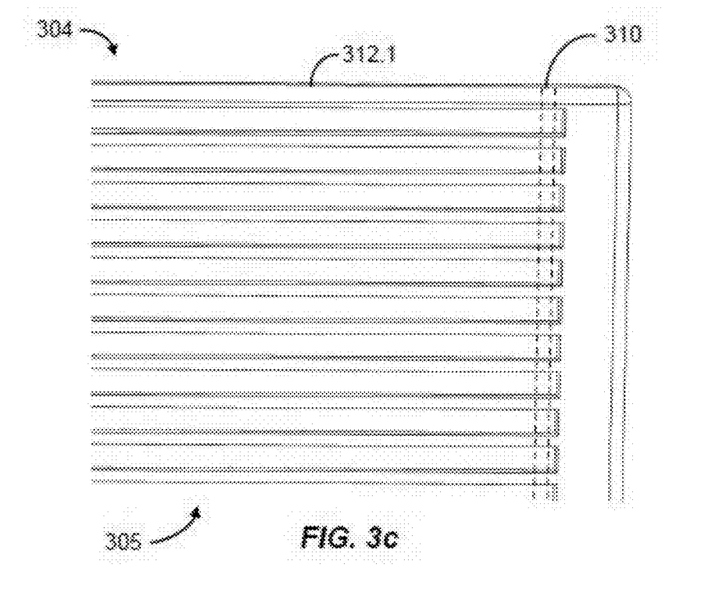

As further shown in FIG. 3b, the backplate 304 includes the air bleed channel 310 configured to allow any air trapped in the linear grooves 305 to be released. In one embodiment, the air bleed channel 310 is implemented across the surface of the backplate 304, substantially perpendicular to and intersecting the rows of elongated linear grooves 305, to release any air trapped in the grooves 305 at the opposing edges 312.1, 312.2 of the backplate 304, or through one or both sides 204.1, 204.2 (see FIG. 2) of the backplate 304. In one embodiment, all four edges of the rectangular backplate 304 are radiused to keep any sharp corners and/or edges from inadvertently abrading the vibrator film layer 206 (see FIG. 2). FIG. 3c depicts a detailed view of one corner of the rectangular backplate 304, showing a portion of the plurality of linear grooves 305, and the air bleed channel 310 substantially perpendicular to and intersecting the rows of linear grooves 305, and extending substantially to the edge 312.1 of the backplate 304.

Figure 3D:
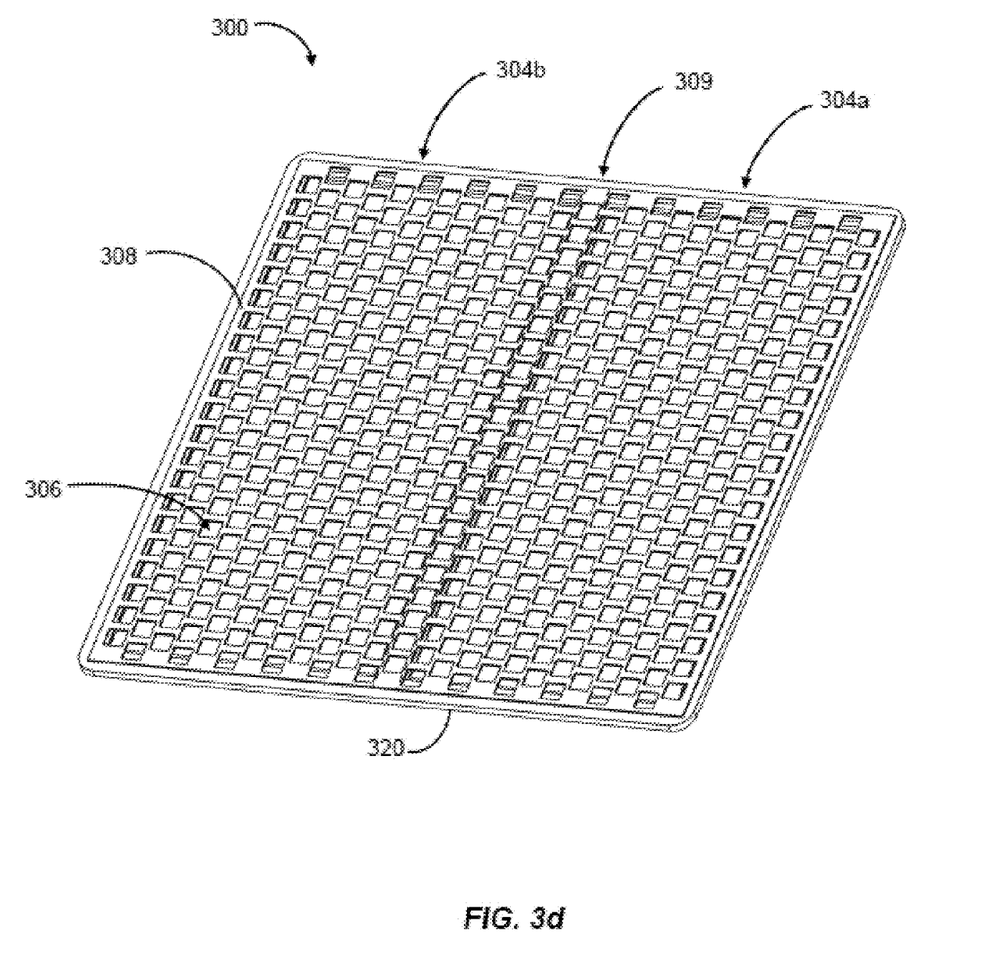

FIG. 3d depicts another view of the ultrasonic transducer array 300 shown in partial construction. Specifically, FIG. 3d depicts the frame 320, the general locations of the rectangular backplates 304a, 304b, a protective front cover 308, and a vibrator film layer 306 sandwiched between the rectangular backplates 304a, 304b and the protective front cover 308. In one embodiment, the protective front cover 308 can be implemented in the form of a protective mesh. To avoid having the protective mesh 308 inadvertently come in contact with the vibrator film layer 306, the ultrasonic transducer array 300 can include at least one support bar 309 disposed across at least one area dimension of the ultrasonic transducer array 300 and between the protective mesh 308 and the vibrator film layer 306. In the event an object (e.g., a person's finger) comes in contact with the protective mesh 308, the protective mesh 308 may impinge upon the support bar 309 without contacting the vibrator film layer 306. In one embodiment, a suitable amount of adhesive-backed felt may be attached to the vibrator film layer 306 to prevent the protective mesh 308 from directly contacting the vibrator film layer 306.

FIGS. 4a-4d are cross-sectional views of exemplary grooves 405a, 405b, 405c, 405d, respectively, which can be formed on a surface of a backplate in the ultrasonic transducer 200 of FIG. 2. As shown in FIGS. 4a-4d, the cross-sectional geometry of the respective grooves 405a, 405b, 405c, 405d can be made to alternate or vary with respect to each groove or specified sets of grooves to optimize bandwidth and frequency response.

In general, the highest forces from the backplate 206 of the ultrasonic transducer 200 are generated near the upper edges of each groove 205, where the first electrode, formed, at least in part, by the backplate 204, is nearest the vibrator film layer 206. This is the region that gives rise to the most displacement. To increase sensitivity, the maximal amount of force as possible should be applied to the vibrator film layer 206. It is noted, however, that a typical ultrasonic transducer may saturate due to the vibrator film layer 206 reaching its elastic limit, or due to the dielectric strength of the air. The case of the vibrator film layer 206 reaching its elastic limit can be observed from the differences in maximum amplitude for varying thicknesses of the vibrator film layer 206. For any output voltage, it is possible to obtain a higher output (in saturation) for a thinner vibrator film layer 206 as opposed to a thicker vibrator film layer 206. Once the vibrator film layer 206 reaches its elastic limit, there can be a significant change in modulus, preventing any higher output.

In order to maximize displacement while minimizing the modulus, the grooves 405a, 405b, 405c, 405d (see FIGS. 4a-4d) are made as wide as possible (while considering the total force applied), while avoiding higher resonance modes in the vibrator film layer. Further, the wall angles of the grooves 405a, 405b, 405c, 405d are gradually sloped or inclined to keep the first electrode as close to the vibrator film layer as possible over the maximum area. In one embodiment, each groove 405a, 405b, 405c, 405d can include opposing upper edges having cross-sectional contours that gradually tend toward the deepest parts 422a, 422b, 422c, 422d of the respective grooves, allowing a larger area of the first electrode to be closer to the vibrator film layer. This maximizes the force on the vibrator film layer (approximately inversely proportional to distance), leading to maximal displacement and sensitivity. In another embodiment, each groove 405a, 405b, 405c, 405d can have one or more walls with one or more radiused, sloped, inclined, or angled portions. For example, one or more walls of the groove 405a, 405b, 405c, 405d may be configured to have varying slopes, e.g., a shallower slope, incline, or angle at, near, or toward the upper edges of the groove, and to have a steeper slope, incline, or angle at, near, or toward the deepest part of the groove.

Figure 4A:
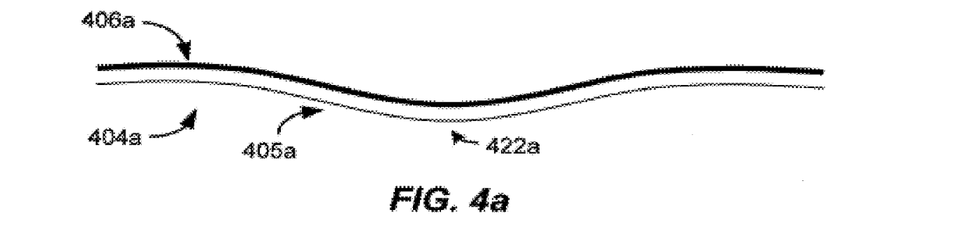
FIGS. 4a-4d are cross-sectional views of exemplary grooves that can be formed on a surface of a backplate in the ultrasonic transducer of FIG. 2.

FIG. 4a depicts a cross-sectional view of the groove 405a, which has a catenary shape to better conform to the average displacement of a vibrator film layer 406a under biasing, thereby assuring that the vibrator film layer 406a is as close as possible to the backplate 404a over its entire surface.

Figure 4B:
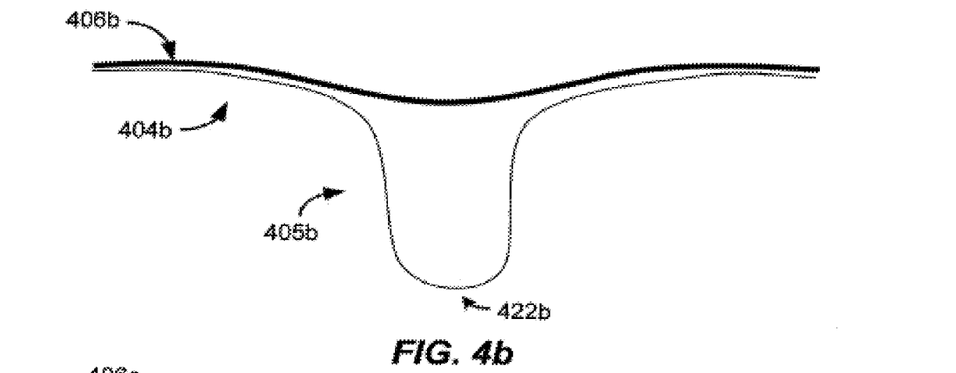

It is noted that a lack of depth in a groove may significantly raise the resonance frequency, which may need to be compensated. With reference to FIG. 4b, instead of using a thicker vibrator film layer 406b (which would increase bending stiffness and likely reduce maximum output), a larger volume of air may be allowed into the groove 405b for compliance, thereby reducing resonance frequency. Depending on manufacturing constraints, such a larger volume of air in the groove 405b can be provided by forming a deeper depression in the center 422b of the groove 405b with a sloped contour to ensure even air pressure distribution. As shown in FIG. 4b, the vibrator film layer 406b is very close to the backplate 404b at most points, while providing a larger volume of air in the groove 405b to reduce the resonance frequency.

Figure 4C:
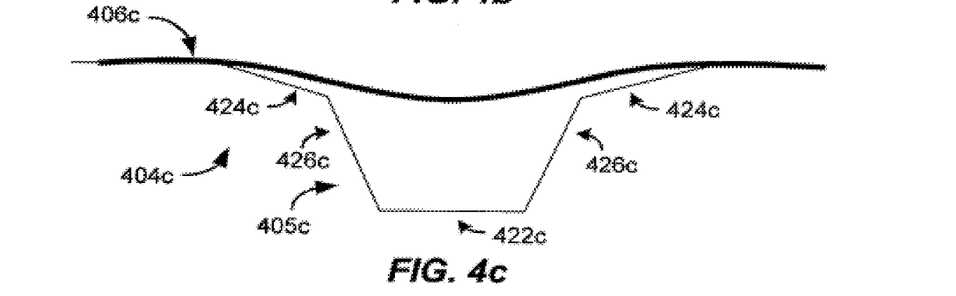

Such a larger volume of air can also be provided using a segmented groove 405c with at least two distinct gradually sloping areas 424c, 426c, as depicted in FIG. 4c. Because electric field strength is inversely proportional to the distance between the two electrodes (e.g., the metallized surface of the vibrator film layer 406c, and the surface of the backplate 404c), the electric field, and therefore the force on the film 406c, is highest near the gradual slopes 424c. The steeper slopes 426c provide a cavity for acoustic compliance, and contribute less to the overall output.

Figure 4D:
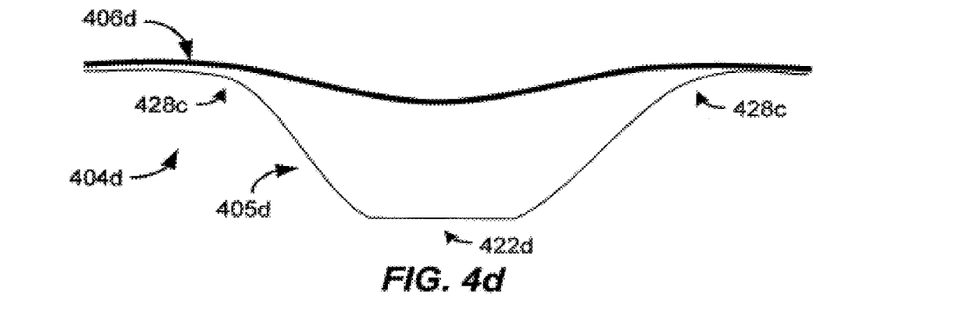

Another approach is to use a trapezoidal-shaped groove 405d with radiused, sloped, angled, or inclined opposing upper edges 428c. The presence of the additional electrode area near the vibrator film layer 406d provides more force when the ultrasonic transducer is transmitting, and more sensitivity when the ultrasonic transducer is receiving. For example, the opposing upper edges 428c may be radiused to be greater than 1 mil, greater than 2 mil, about +/−3 mil, or any other suitable value. In one embodiment, the opposing upper edges 428c may have substantially equal varying slopes to allow an increased area of the surface of the backplate 404d to be near the vibrator film layer 406d.

Figure 5:
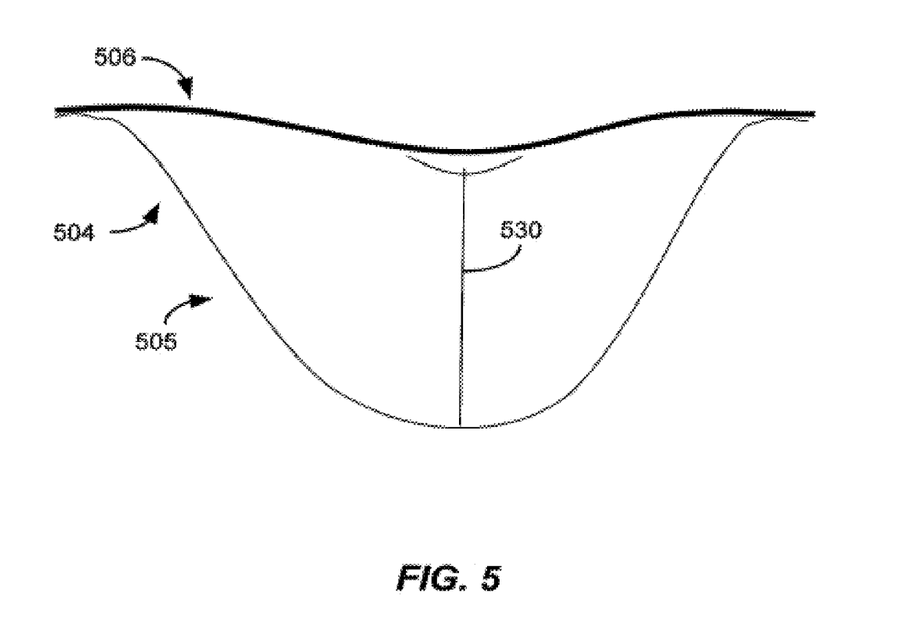
FIG. 5 is a diagram of an exemplary pillar structure that can be implemented in the grooves of FIGS. 4a-4d.

FIG. 5 depicts an exemplary electrically conductive pillar structure 530 that can be implemented in a groove 505, as well as any of the grooves 405a, 405b, 405c, 405d of FIGS. 4a-4d. Such use of the pillar structure 530 allows an increased area of the electrode formed, at least in part, by the backplate 504, to be nearer to the vibrator film layer 506, thereby generating more force.

Figure 6:
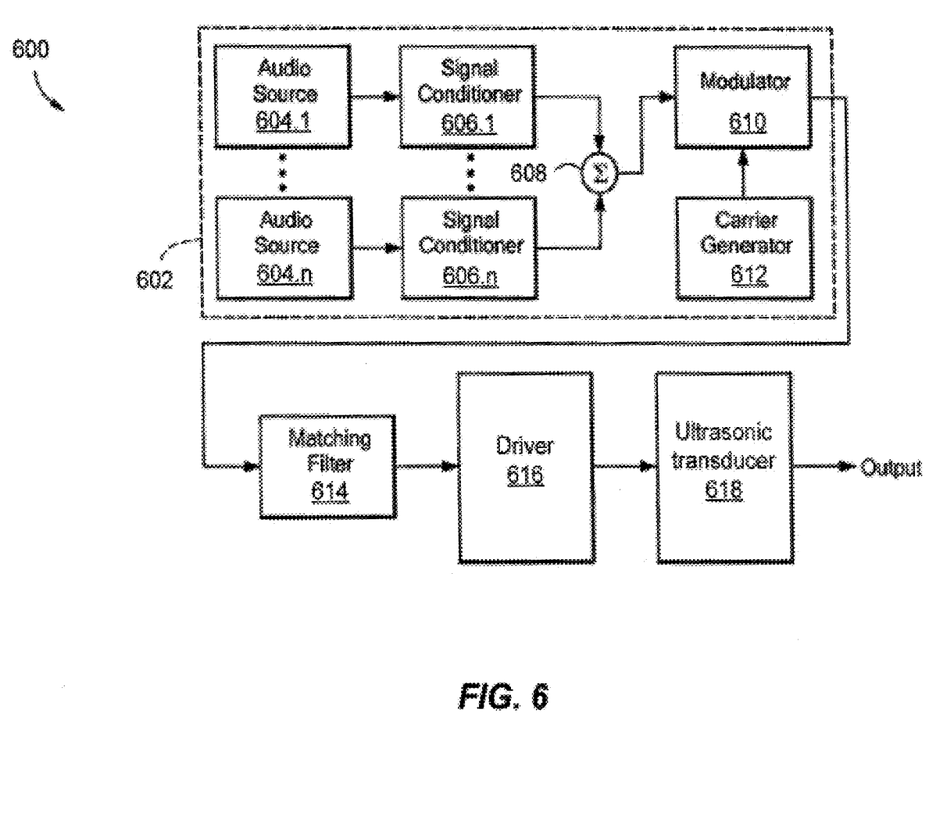
FIG. 6 is a block diagram of an exemplary parametric audio system including the ultrasonic transducer of FIG. 2.

FIG. 6 depicts an exemplary parametric audio system 600, in which an ultrasonic transducer 618 conforming to the ultrasonic transducer 200 of FIG. 2 may be employed. As shown in FIG. 6, the ultrasonic transducer 618 is driven by a signal generator 602, which includes an ultrasonic carrier signal generator 612 and one or more audio signal sources 604.1-604.n. Optional signal conditioning circuits 606.1-606.n receive respective audio signals generated by the audio signal sources 604.1-604.n, and provide conditioned audio signals to a summer 608. It is noted that such conditioning of the audio signals may alternatively be performed after the audio signals are summed by the summer 608. In either case, the conditioning typically comprises a nonlinear inversion necessary to reduce or effectively eliminate distortion in the reproduced audio. The conditioning may additionally comprise standard audio production routines such as equalization (of audio) and compression.

A modulator 610 receives a composite audio signal from the summer 608 and an ultrasonic carrier signal from the carrier generator 612, and modulates the ultrasonic carrier signal with the composite audio signal. The modulator 610 is preferably adjustable in order to vary the modulation index. Amplitude modulation by multiplication with a carrier is preferred, but because the ultimate goal of such modulation is to convert audio-band signals into ultrasound, any form of modulation that achieves that result may be employed.

The modulator 610 provides the modulated carrier signal to a matching filter 614, which is configured to compensate for the generally non-flat frequency response of a driver amplifier 616. The matching filter 614 provides the modulated carrier signal to the driver amplifier 616, which, in turn, provides an amplified version of the modulated carrier signal to the ultrasonic transducer 618. The ultrasonic beam output, which comprises the high intensity ultrasonic carrier signal amplitude-modulated with the composite audio signal, is demodulated on passage through the air due to the nonlinear propagation characteristics of the propagation medium to generate audible sound.

Having described the above exemplary embodiments of the disclosed systems and methods, other alternative embodiments or variations may be made. For example, with reference to the linear grooves 405a, 405b, 405c, 405d illustrated in FIGS. 4a-4d, the air gap can be replaced with a tube of air, a passive radiator, or any other suitable mass element to lower the resonant frequency. The electrode formed, at least in part, by the backplate can also be made to extend from the deepest part of the groove, and can be at least partially configured as a pillar, a ring, a tube, a T-shape, or any other suitable shape, to bring the electrode closer to the film. In addition, to assist in film engagement, the backplate can be configured to be curved (bowed) such that it is convex relative to the linear grooves, e.g., ranging from about 0.002 inches to 0.100 inches over about a 6-inch span.

It will be appreciated by those of ordinary skill in the art that further modifications to and variations of the above-described ultrasonic transducers may be made without departing from the inventive concepts disclosed herein. Accordingly, the invention should not be viewed as limited except as by the scope and spirit of the appended claims.

What is claimed is:

1. A backplate for use in an ultrasonic transducer, the ultrasonic transducer including a vibrator film layer, comprising:
   a first surface configured to face the vibrator film layer; and
   a plurality of depressions formed on the first surface,
   wherein at least some of the plurality of depressions include opposing sides with upper surfaces having cross-sectional contours with substantially equal varying slopes to allow an increased area of the first surface of the backplate to be near the vibrator film layer,
   wherein one or more of the plurality of depressions have one or more walls with one or more radiused, sloped, inclined, or angled portions,
   wherein one or more of the walls include a shallower sloped, inclined, or angled portion at, near, or toward the upper surfaces of the respective depressions, and a steeper sloped, inclined, or angled portion at, near, or toward the deepest parts of the respective depressions, and
   wherein at least part of the shallower sloped, inclined, or angled portion of at least one of the walls is approximately parallel to the vibrator film layer at, near, or toward the upper surfaces of the respective depressions.

2. The backplate of claim 1 wherein at least some of the respective depressions have at least one open end to allow any air trapped in the respective depressions to be released.

3. The backplate of claim 1 wherein the first surface has one of a rectangular, square, and hexagonal shape.

4. The backplate of claim 1 wherein at least some of the respective depressions have a circular dimple configuration.

5. The backplate of claim 1 wherein the cross-sectional contours of the upper surfaces are configured as substantially curved contours.

6. A backplate for use in an ultrasonic transducer, the ultrasonic transducer including a vibrator film layer, comprising:
   a first surface configured to face the vibrator film layer;
   a plurality of depressions formed on the first surface;
   wherein at least some of the plurality of depressions include opposing sides with upper surfaces having cross-sectional contours with substantially equal varying slopes to allow an increased area of the first surface of the backplate to be near the vibrator film layer; and
   a channel implemented across the first surface of the backplate, intersecting at least some of the respective depressions, thereby allowing any air trapped in the respective depressions to be released.

\* \* \* \* \*